United States Patent Office 2,827,417
Patented Mar. 18, 1958

2,827,417

ION EXCHANGE PURIFICATION OF BASIC ANTIBIOTICS

Ira J. Friedman, Hicksville, Edward G. Martin, Whitestone, and Roy J. Taylor, Flushing, N. Y., assignors to Chas. Pfizer & Co., Inc., New York, N. Y., a corporation of Delaware No Drawing. Application September 3, 1954
Serial No. 454,202

5 Claims. (Cl. 167—65)

This invention is concerned with a new and highly useful method for the recovery of certain basic antibiotics. In particular, it is concerned with the recovery of certain antibiotics possessing highly basic groups, by means of a series of steps involving the use of ion-exchange resins.

A variety of methods have been utilized for the recovery of antibiotic compounds. These generally involve multi-step processes to obtain the highly purified materials required for use in therapy of infectious diseases. The separation of the active material from the variety of impurities, both organic and inorganic, that occur in fermentation broths often requires the preparation of complex derivatives or salts such as salts with certain acid dyes and other organic acids. Many of the processes involve the use of organic solvents for the extraction of antibiotics from aqueous solution. Often the extraction processes are operated in highly complex apparatus such as Podbielniak extractors.

Ion-exchange resins have been extensively used as one step in processes for the recovery of basic antibiotics, particularly compounds such as streptomycin. Such processes have been disclosed in U. S. Patents Nos. 2,541,420, 2,528,188, 2,528,022, and 2,667,441. Some of these methods have utilized ion-exchange resins bearing carboxyl groups as the principal active exchanging groups. However, almost invariably, the preparation of pure amorphous or crystalline basic antibiotics or their salts has required the use of steps such as selective fractional precipitation or fractionation by extraction with solvents and other methods in addition to the use of ion-exchange resins, to assure the formation of products of high purity.

It has now been found that basic antibiotics, including such compounds as streptomycin, viomycin, dihydrostreptomycin, hydroxystreptomycin, streptothricin, mannosidostreptomycin, and neomycin, which generally possess highly basic groups, such as guanidino groups, may be purified with unexpected convenience by the use of a series of steps involving the use of more than one acidic ion-exchange resin purification step. These antibiotics are those which form with mineral acids simple salts which in aqueous solution have a pH near neutrality. This process has many advantages over previously used processes for the purification of basic antibiotics. In particular, the process permits a high degree of purification without the use of organic solvents. Nor does it require the use of complex organic acids such as certain dyes, picric acid, Reinecke's acid and other such agents to achieve a high degree of purification of the antibiotic. Relatively simple equipment which may be utilized for more than one of these antibiotics is effective in this process. Furthermore, since the same type of equipment is used in each of the steps involved, the purchase of various types of equipment may be eliminated and the antibiotic recovery plant confined to the simplest form.

A highly unexpected advantage of the present process is that the formation of pyrogens and histamine-like materials, which often occurs in the recovery of basic antibiotics, particularly when these materials are contacted with solvents and are maintained at basic pH's for extended periods, seems to be practically completely avoided by the present method. This is a most useful advantage of the process since it is often necessary to use a separate process step for the removal of pyrogens.

In the operation of the present process, an impure basic antibiotic solution, such as filtered antibiotic broth, is first passed at a pH of from slightly acidic to slightly basic (e. g. 6.0 to 9.0) over an ion-exchange resin having as its principal exchanging groups carboxyl groups and prepared by the polymerization in beadlet form of methacrylic acid or, preferably, an ester of methacrylic acid and from about six percent to about twelve percent of a divinyl aromatic compound, such as divinylbenzene, divinyltoluene, divinylnaphthalene, and so forth, as a crosslinking material. If an ester is used to form the resin, the ester groups in the resin must of course be hydrolyzed to acid groups. Such resins are marketed commercially by the Rohm & Haas Company under the trade-name "Amberlite IRC50." They are described in detail in U. S. Patent 2,579,974. The resin is at least partially in salt form and is preferably adjusted to an equilibrium pH of from neutral to slightly basic (about 7 to 8) by means of an alkali (e. g. sodium hydroxide or potassium hydroxide) before contacting with the antibiotic solution. The antibiotic adsorbed on the resin is then eluted from the ion-exchange resin by means of a dilute acid, preferably a mineral acid, such as dilute hydrochloric acid or dilute sulfuric acid. This process step and the subsequent steps in the process may be operated in a so-called "two-tower" process such as is described in U. S. Patent No. 2,528,188. The eluate from the resin is adjusted, preferably at once, to a pH which is from neutral to slightly basic, that is, from about 6.0 to about 9.0, preferably 7.0 to 8.0. This may be done by removal of excess acid as described below or by addition of an alkaline agent, e. g. sodium or potassium hydroxide. The solution obtained in this manner, although a great deal more pure on a dry basis than is such an impure solution as fermentation broth, does have certain uses, for instance, in veterinary medicine or in agricultural uses. The solution is then contacted with a second ion-exchange resin.

The second ion-exchange resin used for conducting the next purification step of the present process is also a synthetic cation exchange resin. It consists of a resin of considerable porosity, that is, capable of adsorbing a high proportion of organic bases of fairly high molecular weight, (over about 150). These resins are characterized by a relatively large increase in volume on contacting the dry resin with water or converting the salt form of the resin to the acid form. The resins of low porosity show little such change in volume. Such resins of high porosity may be prepared by copolymerization of an ester of acrylic acid with a minor proportion (from about 1 to about 15%) of a divinyl aromatic compound, such as divinylbenzene. Alternatively a copolymer of a methacrylic ester and a low proportion (about 1 to 4%), of a divinyl aromatic compound may be used. Saponification of the resulting products, which are prepared in beadlet form, yields porous carboxylic acid cation exchange resins. Amberlite XE89, manufactured by Rohm & Haas Company, is a particularly good form of this material. These resins have been found to adsorb, in a relatively short contact time, a basic antibiotic, such as viomycin, neomycin, or streptomycin, to an extent of 50% or more of the theoretical capacity of the resin. This is not true of the type of resin used in the first step of the present process, that is, the Amberlite IRC50–type resin, which only adsorbs these compounds during a practical period of contact to the extent of about 10 to 20 percent of its total capacity. In the operation of the second step of the present process, the ion-exchange resin is generally first partially converted to a salt of an alkali metal cation, such as sodium, e. g. by washing with a dilute aqueous solution of sodium hydroxide until the equilibrium pH is from neutral to slightly basic (i. e. about pH 6 to 9). The antibiotic solution obtained from the first ion-exchange column by elution with dilute mineral acid is treated to remove salts: for instance, it may be neutralized and, in order to minimize the introduction of salt, the eluting acid may be dilute sulfuric acid and the neutralizing agent barium hydroxide, in which case barium sulfate separates and is removed. Alternatively, the excess acid may be removed with an anion exchange resin or the water may be removed for instance by drying from the frozen state after neutralization with an organic amine which forms a solvent-soluble salt with the acid used for elution of the resin. Replacement of water with a suitable solvent permits separation of the antibiotic salt. Such a process is described in U. S. Patent No. 2,560,891. Other combinations of an acid and a base that form an insoluble salt may be used.

The partially purified antibiotic solution from elution of the first resin is passed into contact with the second ion-exchange resin, preferably in a column, and this is continued until the selected resin reaches equilibrium with the antibiotic. This results in a large part of the cations present in the feed solution passing through the column without being adsorbed. It is relatively easy to check samples of the antibiotic solution leaving the column and to determine when this solution approximately equals in concentration of antibiotic that which enters the column. At this point further addition to the column is stopped and the antibiotic is eluted with dilute mineral acid. If sulfuric acid is used, the excess acid may be removed by precipitation with barium hydroxide or by the other methods indicated above. The solution may then be used for various purposes.

Often the product obtained from contact with the second resin is of such high purity that the material may be dried and utilized for therapeutic purposes directly without further purification. The presence of minor amounts of colored materials may be eliminated by adsorption on charcoal, if desired, but this is not an essential step of the process. It should be noted that, if a resin of the XE89-type is used before the IRC50-type resin, large amounts of colored impurities and higher molecular weight materials would be adsorbed on the resin together with the antibiotic in the first step. Application of the Amberlite IRC50 as the second step would then not bring about any appreciable purification. Furthermore, the use of repeated treatment with a single type of these resins would not achieve the same high degree of purification in such a simple manner. In general the inorganic impurities are reduced more readily by the present process, which displays a greater selectivity in recovering the antibiotics.

Both polymers of the type used in the first step of the process and in the second are preferably prepared in beadlet form, and polymerization in this form may be accomplished by treatment of the mixture of monomers in aqueous suspension with a peroxide. Details of the preparation of the type of resins used in the second step of this process are given in the copending application, Serial No. 288,951, filed on May 20, 1952, by Edwin N. Lightfoot, Jr. These polymers being loosely cross-linked and porous have been found to be extremely effective in adsorbing a very high proportion of the basic antibiotics. This results in the adsorption of an amount of the antibiotic which approaches the theoretical exchanging capacity of the resin under equilibrium conditions. This is not true of the type of ion-exchange resin used in the first step of the process, which, under operating conditions normally used for the recovery of antibiotics, does not approach in its adsorptive capacity the equilibrium value.

When streptomycin broth is used as starting material for the two stages described above, the solution obtained by elution from the second type of ion-exchange resin may have a potency of as high as twenty to thirty milligrams of antibiotic (base) per milliliter and, on a dry basis, may possess a purity of 70% or more by weight. If desired, an even higher level of purity may be achieved by using a further purification step which may be used either before or after the second carboxylic acid-type resin. This involves contact with a sulfonic acid ion-exchange resin of low porosity which possesses a high proportion of cross-linking components. This step is conducted with the ion-exchange resin in the acid form, that is, as the free sulfonic acid. Resins which are copolymers of sulfonated polystyrenes and divinyl aromatic compounds, such as divinylbenzene, are particularly useful. Such resins are available commercially under the trade-name "Dowex 50." These contain varying proportions of divinylbenzene as the cross-linking component. A proportion of approximately 16 percent of divinylbenzene is quite useful. Somewhat higher or lower proportions, that is, between about 10 and 20 percent, may be used for this purpose. This type of resin is described in U. S. Patent 2,366,007.

Such a resin when utilized in its acid form, that is, at a low pH, retains little or none of the basic antibiotic in a solution which is contacted with it. However, it does retain inorganic cations and various organic impurities to an extent that such solution, after a relatively short contact with the resin at a low pH, that is, from about 1.0 to about 2.5, is of very high purity. This process step is preferably operated with resin in a tower. The free acid remaining in the effluent solution is then neutralized. Sulfuric acid is preferably used in the previous step and, after contact with the resin, the excess acid not required for combination with the basic antibiotic as a salt is removed by precipitation with a reagent such as barium hydroxide. The solution remaining after removal of the precipitated salt is a very highly purified form of the antibiotic. This material may be filtered to obtain a solution which may be used directly in therapy, in animal nutrition or for other purposes. It may be dried, for instance by lyophilization, to yield a product which is eminently suitable for incorporation in pharmaceutical products. It is practically free of pyrogens and possesses little or no histaminic materials. The solution may be sterilized and it may be combined with stabilizers or other useful substances.

When this process (three steps) is utilized for the purification of streptomycin, it is found that the product has a purity approaching 95 percent. It should be noted that the process does not result in the separation of streptomycin B, which is not deleterious but does posses a lower activity than streptomycin. If it is desired to obtain a product containing a particularly low proportion of this material, suitable fermentation broth should be chosen. It should also be noted that the present process very effectively removes a common and undesirable contaminant of commercial streptomycin products, that is, the inactive material, streptidine.

In many cases it is possible to crystallize the basic antibiotic in highly purified form by concentrating the aqueous effluent from the second resin and adding a water-miscible organic solvent, such as methanol or ethanol. In some cases where the impure antibiotic (e. g. antibiotic fermentation broth) used as starting material is of particularly poor quality or contains particularly high levels of inorganic and organic impurities, it is desirable to effect the purification of such a solution by contacting the crude material with the three different types of ion-exchange resins in sequence. When this is done, the preferred order is that sequence in which the ion-exchange process steps have been described above; that is, the Amberlite IRC50-low capacity methacrylic acid-divinylbenzene type resin is first used in a form which is partially neutralized. As the second stage, the more porous acrylic ester-divinylbenzene saponification product is used and, finally, the partially purified solution is subjected to further purification by contacting it with the Dowex 50 highly cross-linked sulfonic acid type resin to obtain a solution with a very high order of purity. If steps two and three of this three-step process are reversed in order, the degree of purification achieved is remarkably high, but not quite that which is achieved by the above preferred sequence. It should be pointed out that with each of the carboxylic resins the antibiotics form definite salts, the resin acting as a macromolecular polybasic acid. The salts of the antibiotics with the resins are useful for such purposes as feed enrichment.

The following examples are given by way of illustration and are not to be considered as the sole embodiments of this invention. It is to be understood that protection hereof is only limited by the specific wording of the appended claims.

*Example I*

A column was filled with Amberlite IRC50-type carboxylic cation exchange resin. This resin was equilibrated with dilute sodium hydroxide until a pH of 7.5 was reached. Streptomycin fermentation broth that had been filtered under acidic conditions was adjusted to approximately neutrality with sodium hydroxide and the solution of the antibiotic was passed into the ion-exchange column. Samples of the effluent from the column were analyzed periodically until it was found that the concentration of streptomycin in the broth leaving the column was substantially the same as that entering the column. Introduction of the solution was stopped and the resin was washed with several volumes of water. The antibiotic was then eluted from the resin with 0.35 N-hydrochloric acid solution. As the eluate left the column it was neutralized with sodium hydroxide. It was found on analysis of the total streptomycin in the eluate that approximately 15 percent of the total capacity of the resin had been utilized for the adsorption of antibiotic. Little of the organic impurities in the original broth had been retained on the column, but the eluate, which contained 10 milligrams per milliliter of streptomycin, also contained about 20 milligrams per milliliter of solution of inorganic salts (determined by evaporation of a measured sample and ashing in the presence of sulfuric acid). The solution also contained about 4 milligrams per milliliter of unidentified colored organic impurities.

A second column was prepared containing 115 milliliters of the Amberlite XE89-type carboxylic acid cation exchange resin. The resin was equilibrated with sodium hydroxide to a pH of 7.8. The neutralized eluate from the previous column was introduced to the second column. At periodic intervals the effluent from the column was tested for its streptomycin concentration. After a total of three liters of the partially purified streptomycin solution had been fed to the column, it was found that no further antibiotic was being removed from it, that is, the concentration of antibiotic in the feed and in the effluent was the same. Addition to the column was stopped and the resin was washed with water. The antibiotic was then eluted with 0.36 N-sulfuric acid solution. The excess acid in the eluate was neutralized at once with barium hydroxide solution. Precipitated barium sulfate was filtered and the aqueous solution was analyzed for streptomycin. It was found that approximately 50 percent of the total capacity of the resin had been utilized for adsorption of streptomycin. The eluate contained about 30 milligrams per milliliter of antibiotic as the base, and about 6 milligrams per milliliter of inorganic salts (when determined as sulfated ash). Only about one-third of the colored impurities present in the feed of the second column was retained in the eluate.

A third column was prepared containing 30 milliliters of a sulfonated copolymer of polystyrene and approximately 16 percent by weight of divinylbenzene (available as Dowex 50–X16). The resin was treated with dilute surfuric acid to convert it completely to the acid form and was then washed with water to remove excess acid. The neutralized eluate from the previous column was fed to the Dowex 50–X16 column until the pH of the effluent from the column showed a definite rise. Approximately 660 milliliters of effluent had been collected up to this point. It was neutralized at once with barium hydroxide and the precipitated barium sulfate was filtered. Practically quantitative recovery of the streptomycin from the column was achieved. The solution had a concentration of 25 milligrams per milliliter as streptomycin base and only 0.62 milligram per milliliter of inorganic salts (as sulfated ash). Concentration of the solution under vacuum, treatment with a small amount of activated carbon and addition to several volumes of methanol yielded a precipitate of streptomycin sulfate of high purity. This material was filtered and dried under vacuum. It was found to contain 1.64 percent ash and the potency of the product when corrected for volatile material was found to be approximately 790 micrograms per milligram, compared with a theoretical potency of 798 micrograms per milligram for streptomycin sulfate.

*Example II*

Filtered viomycin fermentation broth was adjusted to pH 7.5. Analysis indicated it to contain 300 micrograms of the antibiotic per milliliter of solution. This material was fed to a column containing Amberlite IRC50 resin equilibrated at pH 7.5 with dilute sodium hydroxide. The antibiotic solution was added to the column until the concentration of the antibiotic in the effluent was very close to that of the feed solution. The column was then washed with water and the antibiotic was eluted from the resin with 0.35 N-sulfuric acid solution. The eluate from the column was neutralized at once with barium hydroxide and the precipitated barium sulfate was filtered. The neutralized eluate contained about 8 milligrams per milliliter of viomycin as the base and 7 milligrams per milliliter of sulfated ash. Approximately 12 percent of the total capacity of the resin had been utilized for adsorption of the antibiotic.

One portion of the eluate from the above column (50 gallons) was fed at a pH of 7.5 to a column containing 3750 milliliters of Amberlite XE89 type resin which had previously been equilibrated with dilute sodium hydroxide at pH 7.5. The resin adsorbed the antibiotic viomycin to the extent of about 80 percent of its total exchanging capacity. Addition of the partially purified viomycin solution was continued until the effluent from the column had approximately the same antibiotic content as the solution being introduced. Addition was then stopped and the column was washed with water. The antibiotic was eluted with 0.35 N-sulfuric acid solution and the eluate was neutralized at once with barium hydroxide. Precipitated barium sulfate was filtered and the eluate was concentrated under vacuum at a moderately elevated temperature to a volume of 11 liters. Analysis of a sample showed the concentrate to contain 102 milligrams of viomycin (as the base) per milliliter and only 5 milligrams of ash (sulfated) per milliliter. Treatment of the eluate with activated carbon removed a small amount of residual color. Addition of 2 volumes of methyl alcohol to the aqueous solution resulted in the crystallization of viomycin sulfate. This material weighed 1275 grams when dried under vacuum. It contained one percent ash and 9.3 percent of volatile material. When corrected for the volatile material present, the potency was found to be approximately 805 micrograms per milligram. The theoretical potency of pure viomycin sulfate is 820 micrograms per milligram. Thus, an extremely high purity is achieved by the simple process described above.

Example III

Neomycin fermentation broth was acidified and filtered and then neutralized. This material contained approximately 730 micrograms of neomycin per milliliter. One hundred and forty (140) liters of the solution was fed to a column containing one liter of Amberlite IRC50 carboxylic acid ion-exchange resin which had been adjusted to approximately neutrality with dilute sodium hydroxide. Almost quantitative adsorption of the antibiotic on the resin was achieved. The resin was washed with water and then eluted with one percent sulfuric acid solution. The eluate was neutralized at once with barium hydroxide and the precipitated barium sulfate was filtered. The filtered solution was analyzed and found to contain 10 milligrams of neomycin (as the base) per milliliter and about 8 milligrams of sulfated ash per milliliter.

A portion of neutralized partially purified neomycin solution obtained from the Amberlite IRC50 column was fed to a column of Amberlite XE89 which had been equilibrated with dilute sodium hydroxide at a pH of about 7.0. The solution was fed to the column until appreciable amounts of antibiotic were detected in the effluent. The column was washed with water and then eluted with one percent sulfuric acid solution. The excess acid in the effluent was neutralized with barium hydroxide and the precipitated barium sulfate was filtered. The eluate contained about 20 milligrams of neomycin per milliliter and 5 milligrams of sulfated ash per milliliter. It was passed through a column containing Dowex 50-X16 resin in the acid form. Practically all of the ash was removed from the material with little or no loss of neomycin. The effluent from the column was neutralized with barium hydroxide. The precipitate was filtered and the residual color was removed with a small amount of activated carbon. The purified solution was poured into several volumes of methanol and the precipitated neomycin was filtered. The product contained one percent sulfated ash and 3.2 percent volatiles. Correction for the volatile material gave analysis of about 650 micrograms per milligram as compared to 670 micrograms per milligram of pure neomycin sulfate. The product obtained by this relatively simple process was found to be quite suitable for therapeutic use.

Example IV

Filtered streptomycin fermentation broth containing antibiotic potency of 800 mcg./ml. was passed over a column containing Amberlite IRC50 type resin at a pH of 7.5. The antibiotic was eluted from the resin with 0.35 normal hydrochloric acid and the eluate was neutralized with sodium hydroxide. In adsorption of the antibiotic, approximately 15 percent of the capacity of the resin had been utilized. The eluate contained approximately 7 mg. of antibiotic per ml. A portion of this material was passed through a column containing 100 ml. of Amberlite XE89 type resin at a pH of 7.5. The antibiotic was eluted from the resin with dilute sulfuric acid. The eluate contained about 18 grams of streptomycin and about 2 grams of ash. Approximately 50 percent of the total capacity of the XE89 type resin had been utilized in adsorption of the antibiotic. The eluate was neutralized with sodium hydroxide and was then passed over a column containing 30 ml. of Dowex 50-X16 type resin in the acid form. The effluent from the column was neutralized at once with barium hydroxide solution. The precipitate of barium sulfate was filtered. The filtrate was concentrated under vacuum and was decolorized with activated carbon. The solution obtained in this manner was added to several volumes of methanol to precipitate streptomycin sulfate. The product was filtered and dried. It assayed 775 mcg./ml. and contained only 0.7 percent ash. A high proportion of the antibiotic in the original broth was recovered in this manner.

Example V

Filtered neomycin fermentation broth was fed at a pH of 7.5 to a column containing 33 liters of Amberlite IRC50 resin which had been previously equilibrated at pH 7.5 with sodium hydroxide solution. When the resin no longer adsorbed neomycin, the feed was stopped and the column was washed with water and then eluted with one percent sulfuric acid solution. A heart cut (that portion containing the maximum concentration of antibiotic) of about 45 gallons of eluate at pH 2.1 was collected. It contained neomycin at a concentration of 12.0 mg./ml., total solids of 31 mg./ml. and sulfated ash of 7 mg./ml. This represents a considerable purification as compared to the fermentation broth. The antibiotic solution was neutralized with barium hydroxide and the barium sulfate was filtered. The filtrate was fed to a column containing Amberlite XE89 resin which had previously been equilibrated with sodium hydroxide at pH 7.5. After the column had been saturated with neomycin, it was eluted with one percent sulfuric acid and excess acid was neutralized with barium hydroxide. The eluate contained 19.5 mg./ml. of neomycin, 40 mg./ml. total solids, and 7 mg./ml. sulfated ash. This solution was passed over Dowex 50-X16 resin at an acid pH. The effluent from the column was neutralized with sodium hydroxide. It was found to contain 15 mg./ml. of neomycin, 23 mg./ml. of total solids, and 0.1 mg./ml. of sulfated ash. The aqueous solution was carefully concentrated under vacuum at a low temperature and neomycin sulfate was isolated by precipitation with ethanol. The dried product was found to have a potency of 660 mcg./mg. and an ash of 1.0 percent. This represents a high purity product very suitable for pharmaceutical use.

What is claimed is:

1. A process for the purification of a therapeutically useful basic antibiotic, which comprises contacting an impure aqueous solution of said antibiotic with a carboxylic acid ion-exchange resin of limited porosity which is a copolymer of methacrylic acid and from about 6 to about 12 percent by weight of a divinyl aromatic hydrocarbon compound and which is at an equilibrium pH of from about 6 to about 9, eluting the antibiotic from said resin with a dilute mineral acid, substantially neutralizing the eluate, contacting said eluate with a carboxylic acid ion-exchange resin of high porosity which is chosen from the group consisting of a copolymer of acrylic acid and from about 1 to about 15 percent by weight of a divinyl aromatic hydrocarbon compound and a copolymer of methacrylic acid and from about 1 to about 4 percent of a divinyl hydrocarbon aromatic compound, which resin is at an equilibrium pH of from about 6 to about 9, and eluting the antibiotic from said resin with a dilute mineral acid.

2. A process as claimed in claim 1 wherein the eluate from the second resin is contacted with a sulfonic acid ion-exchange resin consisting of a copolymer of a polystyrene sulfonic acid and from about 10 to about 20 percent by weight of a divinyl aromatic hydrocarbon compound, which resin is in the acid form.

3. A process as claimed in claim 1 wherein the impure aqueous solution is a filtered fermentation broth.

4. A process for the purification of a basic antibiotic chosen from the group consisting of streptomycin, neomycin, viomycin, dihydrostreptomycin, hydroxystreptomycin, and mannosidostreptomycin, which comprises contacting an impure aqueous solution of said antibiotic with a carboxylic acid ion-exchange resin of limited porosity which is a copolymer of methacrylic acid and from about 6 to about 12 percent by weight of a divinyl aromatic hydrocarbon compound and which is at an equilibrium pH of from about 7 to about 8, eluting the antibiotic from said resin with a dilute mineral acid, substantially neutralizing the eluate, contacting said eluate with a carboxylic acid ion-exchange resin of high porosity which is chosen from the group consisting of a copolymer of acrylic acid and from about 1 to about 15 percent by weight of a divinyl aromatic hydrocarbon compound and a copolymer of methacrylic acid and from about 1 to about 4 percent of a divinyl aromatic hydrocarbon compound, which resin is at an equilibrium pH of from about 6 to about 9, and eluting the antibiotic from said resin with a dilute mineral acid.

5. A process for the purification of a therapeutically useful basic antibiotic, which comprises filtering a basic antibiotic fermentation broth, contacting said fermentation broth at a pH of from about 6 to about 9 with a carboxylic acid ion-exchange resin of limited porosity which is a copolymer of methacrylic acid and from about 6 to about 12 percent by weight of divinylbenzene and which resin is equilibrated at a pH of from about 6 to about 9, eluting the antibiotic from said resin with dilute mineral acid, adjusting the pH of the eluate to from about 6 to about 9, contacting the eluate with a carboxylic acid ion-exchange resin of high porosity which is a copolymer of acrylic acid and from about 1 to about 15 percent by weight of divinylbenzene, which resin is equilibrated at a pH of from about 7 to about 8, until said resin approaches saturation with the antibiotic, eluting the antibiotic from said resin with dilute mineral acid, contacting the eluate with a sulfonic acid ion-exchange resin which is a copolymer of a polystyrene sulfonic acid and from about 10 to about 20 percent by weight of divinylbenzene, said resin being in the acid form, separating the antibiotic solution from the resin, removing excess mineral acid from the antibiotic solution, and recovering antibiotic salt from the filtrate.

References Cited in the file of this patent
UNITED STATES PATENTS

| | | |
|---|---|---|
| 2,340,111 | D'Alelio | Jan. 25, 1944 |
| 2,528,022 | Van Dolah | Oct. 31, 1950 |
| 2,528,188 | Taylor | Oct. 31, 1950 |
| 2,541,420 | Howe | Feb. 13, 1951 |
| 2,702,263 | Shafer | Jan. 25, 1954 |

OTHER REFERENCES

Kunin et al.: Ion Exchange Resins, L950, pp. 157–173.

Pratt et al.: Antibiotics, pub. by Lippincott Co., Philadelphia, pp. 197–199.

Waksman: Streptomycin, pp. 35–42, pub. 1949 by Williams and Wilkins Co., Baltimore, Md.

UNITED STATES PATENT OFFICE

CERTIFICATE OF CORRECTION

Patent No. 2,827,417            March 18, 1958

Ira J. Friedman et al.

It is hereby certified that error appears in the printed specification of the above numbered patent requiring correction and that the said Letters Patent should read as corrected below.

Column 2, line 23, for "2,579,974" read -- 2,340,111 --.

Signed and sealed this 31st day of January 1961.

(SEAL)
Attest:

KARL H. AXLINE
Attesting Officer

ROBERT C. WATSON
Commissioner of Patents